July 22, 1930.  A. L. JOHNSON  1,771,221
PAWL MOTION
Filed April 3, 1928    2 Sheets-Sheet 1
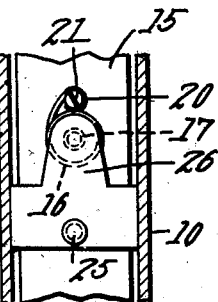
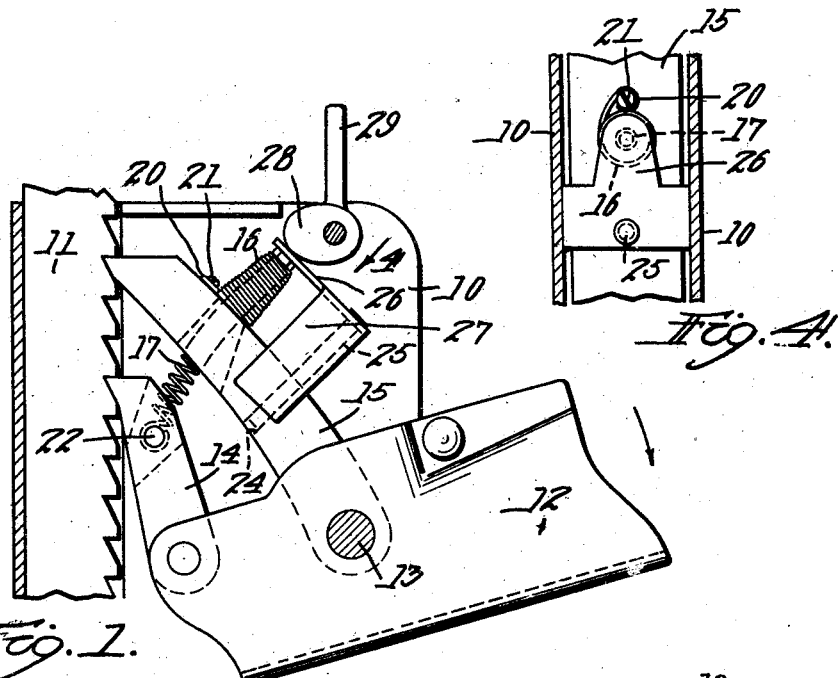
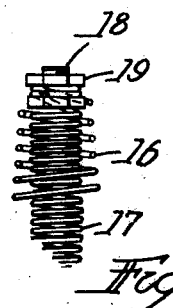
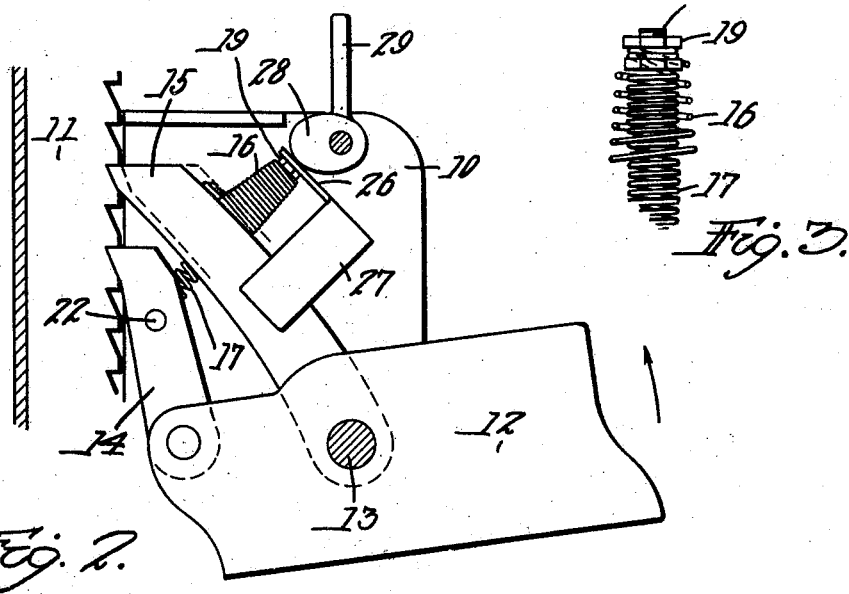

July 22, 1930. A. L. JOHNSON 1,771,221
PAWL MOTION
Filed April 3, 1928 2 Sheets-Sheet 2

Inventor
Alvin L. Johnson
By Attorneys
Southgate Fay & Hanley

Patented July 22, 1930

1,771,221

UNITED STATES PATENT OFFICE

ALVIN L. JOHNSON, OF WORCESTER, MASSACHUSETTS, ASSIGNOR TO W. GOULDING WARREN, OF HOLDEN, MASSACHUSETTS

PAWL MOTION

Application filed April 3, 1928. Serial No. 266,982.

This invention relates to a pawl motion capable of general use but particularly adapted for use in operating a rack, especially for a lifting jack. The principal object of the invention is to provide a rack and pawl mechanism with a controlling device, which involves a double spring arrangement in which, when the pawls are actuated, each time the lever is oscillated, the springs are not distorted in such a way as to cause them to lose their elasticity or tend at all to get them out of place, and in which the spring for operating the lifting pawl is of the coil type and performs its principal function by bending of the coil rather than any direct expansion and contraction in an axial direction, thus avoiding fatigue of the metal which eventually destroys the springs of the types now in use.

The invention also involves a construction in which the two springs for operating the two pawls are both of the coil type and one preferably located within the other and in which the two springs can be formed of a single piece of wire if desired, one passing through the other and through the pawl on which it is mounted and being connected pivotally with the other and adapted to operate the other pawl, that is the lifting pawl, by the bending of the coil spring, instead of by its stretching and contracting.

Other objects and advantages of the invention will appear hereinafter.

Reference is to be had to the accompanying drawings in which

Fig. 1 is a side view of a part of a lifting jack with an embodiment of this invention applied thereto shown in position for lifting the rack;

Fig. 2 is a similar view shown in another position, with the lifting pawl just going down but still with the parts set for lifting;

Fig. 3 is an enlarged side view of the two springs employed;

Fig. 4 is an end view of the springs and the holder associated therewith looking in the direction of the inclined arrow 4 in Fig. 1;

Figure 5:
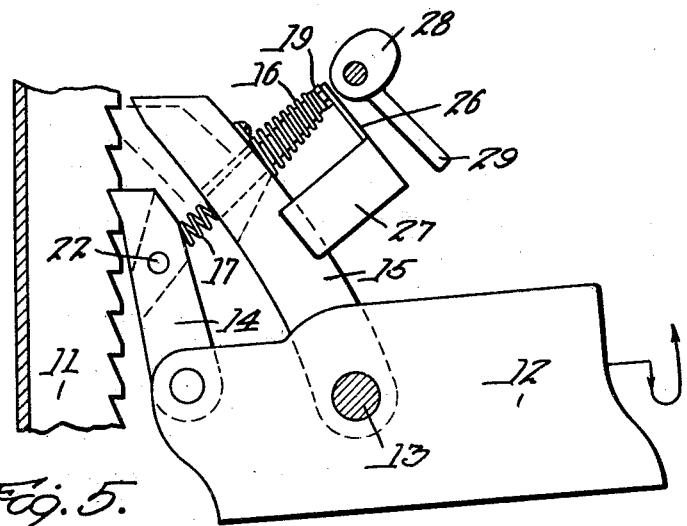
Figs. 5 and 6 are views similar to Figs. 1 and 2, showing the parts set for the lowering of the rack.

It is well known that in the ordinary types of double pawl rack jacks, the pawls are operated by flat or wire springs which have to be distorted in opposition to the force of their resiliency in such a way as to eventually cause fatigue of the metal and crystallization, thus rendering the springs no longer useful. Furthermore, these springs are apt to become displaced on account of the way in which they are constructed. The present invention is designed to secure practically the same operation and with the same rack pawls and operating lever as some of the pawl motions now on the market, but to set and operate the pawls by the springs in such a way that they are not distorted anywhere near up to their limit in any direction and the repeated operation will not result in the destruction of the useful qualities of the spring. Accordingly I have shown the invention as applied to a jack 10, preferably an automobile jack, having a vertical rack 11 for the usual purpose. This is shown as operated by a lever 12 pivoted on a stud 13 and with an operating pawl 14 pivoted to the inner end of the lever. On the stud 13 is pivoted a holding pawl 15, the parts, as so far described, being substantially the same as used heretofore.

Figures 6, 7:
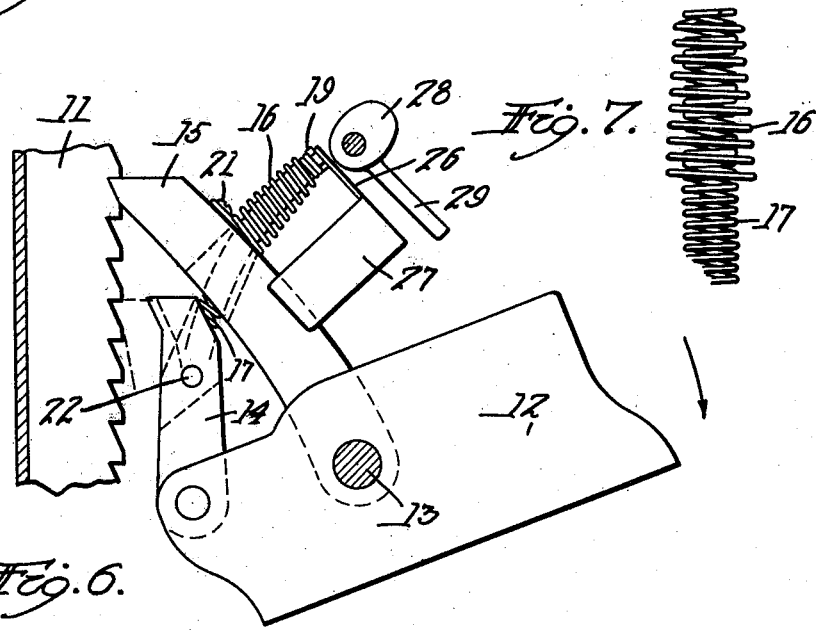
Fig. 7 is a side view of a spring, similar to Fig. 3, but showing it in its preferred form.

In order to secure the above mentioned objects, the pawls are provided with an improved form of spring. This comprises a coil spring 16 and an inner coil spring 17. These two springs can be made separately and secured together at the top by a screw 18 and nut 19 as shown in Fig. 3, or they can be formed in one piece as indicated in Fig. 7. In either case, the spring 16 is shown as of conical form spreading out at the base and the spring 17 is cylindrical all the way from one end to the other. In Fig. 7 these two springs are made of one wire but it changes its convolutions at the top as indicated. Of course the smaller spring is located within the larger one at its end. The spring 16 is provided with an eye 20 in the bottom coil by which it is secured to the pawl 15 by a screw 21 preferably. The spring 17 is coiled around a pin 22 on the pawl 14. Preferably this pawl is bifurcated at the end and this pin is located within the bifurcated portion and the spring extends in through the slot thus provided. This constitutes the entire connection of these springs with the two pawls.

It may be stated, as so far described, these springs are sufficient for use in lowering the rack. When it is desired to raise the rack, I put pressure on the top of this double spring. Through the pawl 15 is a slot 24 and in that is slidingly located a pin 25. This pin carries a plate 26 under its head and guides 27 extending down the sides of the pawl for keeping it in place. The plate 26 and guides 27 are formed of a single piece of sheet metal and the plate projects over the end of the double spring and has no function whatever when the rack is being lowered. When it is to be raised, a reversing cam or lever 28 is brought into contact with the plate 26 to hold it in the position shown in Figs. 1 and 2. This cam is or may be of the usual construction of reversing trip which has a handle 29 for operating it and is movable from the position shown in Fig. 1 to the position shown in Fig. 5.

In order to raise the rack, the reversing trip is thrown up so that pressure is applied constantly to the plate 26. It will be seen that when the lever is lowered as indicated by the arrow in Fig. 1, the spring 16 bears with considerable pressure on the pawl 15 and holds it back against the tooth. There is enough resiliency, however, so that the raising of the rack can force the end of this pawl out, but immediately after it is raised it will swing back under the next tooth. This is indicated in dotted lines in Fig. 2. Now the spring 17, as stated, is connected with the pawl 14 through the pin 22 which, in the position shown in Fig. 1, is located out of alignment with the normal axis of the spring so that in that position this spring 17 is bent downwardly at the bottom and the force of the spring tends to push the pawl back and also by its being put under a longitudinal compression, as the pawl 14 rises, tends to force that pawl against the rack. Now as the lever is lowered, this pawl 14 is kept in contact with the tooth and forces the rack up. When it is moved the distance of one tooth, the holding pawl 15 yields and passes under the next tooth to hold that. On the upward stroke of the handle, the pressure remaining on the plate 26, the pawl 14 is free to swing back against the comparatively slight resistance of the spring 17 and ratcheted over the next tooth below. The continued oscillation of this handle will raise the rack.

The turning of the handle 29 back to the position shown in Figs. 5 and 6 releases all pressure from the plate 26. Now the operation is even more simple. No matter how high the lever 12 is raised, the spring 17 holds the pawl 14 out of contact with the rack but on the next downward motion of the lever, this pawl enters the next tooth higher and as it does so, and slightly lifts the rack at the bottom of the stroke of the lever, it releases the pawl 15 from its tooth. Being now under no force except that of the spring 17 that spring pushes this pawl 15 back as shown in full lines in Fig. 5. As the lever rises, the rack descends. On the continued raising of the lever, the pawl 14 comes down far enough so that the spring 17 is slightly stretched and it applies its force to the spring 16 and thus to the pawl 15 to pull that pawl in further toward the rack so that it acts as a holding pawl until the lever is raised far enough to allow the end of the pawl 14 to be released from its tooth when the spring 17 is stretched as shown in Fig. 6 and will draw it back again for the same reason as stated above. On the lowering action, these pawls are held in engagement with the rack after they have once engaged it and the rack is moved up a little and then lowered the distance of one tooth supported by the descending pawl 14.

This constitutes a very simple operating means for the pawls and, as will be seen, the springs are not distorted nearly to their elastic limit during the operation of the operating lever and the spring 17 performs most of its function by bending instead of by stretching. Where it does perform any work by stretching it is only a slight operation sufficient to pull in the two pawls which does not encounter any resistance. For these reasons the springs will last as long as any of the mechanism and there is no way practically in which the parts can get out of place or in which the metal can become crystallized by continued and reversed distortion.

Although I have illustrated and described only one general form of pawl action and two forms of spring, I am aware of the fact that other modifications can be made therein by any person skilled in the art without departing from the scope of the invention as expressed in the claims.

Therefore, I do not wish to be limited to all the details of construction herein shown and described, but what I do claim is:—

1. In a jack, the combination with a frame and a movable rack therein, of an operating lever pivoted on the frame, a holding pawl for the rack pivoted on the frame, a lifting pawl pivoted to the short arm of the lever under the holding pawl, an extensible spring supported by the holding pawl and connected with the lifting pawl at a point below the holding pawl for pulling the lifting pawl away from the rack at times, and a second extensible spring secured to the holding pawl, projecting beyond the holding pawl on the side opposite the lifting pawl, and connected with the end of the first named spring to support it.

2. In a pawl motion for a rack, the combination with a pivoted lever and two pawls connected therewith, one pivoted on a stationary axis and the other pivoted on the short arm of the lever, of a coil spring fixed to the upper pawl and extending upwardly therefrom and having a smaller coil spring inside it projecting down through it, below the upper pawl, and connected with the lower pawl, whereby the lower pawl is controlled by the action of the inner spring for the purpose of raising and lowering the rack.

3. The combination with a lever and a pair of pawls for operating the rack, of a spring comprising several outer coils of wire secured to and projecting from the outer face of one pawl and a series of coils on a smaller radius projecting from the end of the first series of coils beyond the opposite side of the first pawl and pivotally connected to the other pawl.

4. In a jack, the combination with a frame and a movable rack therein, of an operating lever pivoted on the frame, a holding pawl for the rack pivoted on the frame, a lifting pawl pivoted to the short arm of the lever, a coil spring connected at one end with and passing from beyond the back of the holding pawl and connected with the lifting pawl at a point on the other side of the holding pawl, and located at right angles to the holding pawl whereby when the lifting pawl is drawn back by the lever, the point of connection of the spring to the lifting pawl will tend to place itself between the pivot on which it is connected with the lever and the opposite end of the spring, and the spring will be extended and will tend to raise the lifting pawl and when it is nearly at the top of its stroke, the spring will tend to straighten out into its normal position at right angles to the holding pawl and push the lifting pawl against the rack teeth by the compression of the spring.

5. In a pawl motion for the purpose described, the combination with a rack and a lever, of a holding pawl and a lifting pawl pivotally connected with the lever, the holding pawl and lever being pivoted on the same axis, a coil spring carried by the holding pawl, a smaller coil spring connected with and extending through the first coil spring from the outer end thereof and pivotally connected with the lifting pawl at such a point that when the lever is raised and the lifting pawl lowered, the smaller spring will be pulled down and distorted out of a straight line and when the holding pawl is in position to hold the rack, the lifting pawl will be swung on its pivot from the rack by the relationship of the outer end of the spring with the point at which it is attached to the lifting pawl and the point at which the lifting pawl is pivoted to the operating lever, these three points tending to come into a straight line.

6. In a pawl motion for a lifting jack, the combination with a rack and an operating lever pivoted on a stationary axis to the jack, of a holding pawl pivoted on the same axis, a lifting pawl pivotally connected to the short arm of the lever, an extensible spring connected with the lifting pawl, extending beyond the holding pawl, and normally substantially at right angles to the latter, and means on the holding pawl for supporting the outer end of said spring, said spring being so related to the other parts that when the lifting pawl is lowered by the turning of the lever the spring is distorted out of straight position and tends to swing the lifting pawl back upwardly toward the rack teeth under normal conditions.

7. In a pawl motion for a lifting jack, the combination with a rack and an operating lever pivoted in stationary position to the jack, of a pivoted holding pawl pivoted on the same axis, a lifting pawl pivotally connected to the short arm of the lever, an extension spring connected with the lifting pawl and extending beyond the holding pawl, a spring on the holding pawl and connected with the outer end of said extension spring, said extension spring being so related to the other parts that when the lifting pawl is lowered, by the turning of the lever, the spring is distorted out of straight position and therefore tends to swing the lifting pawl back upwardly toward the rack teeth under normal conditions, and means for exerting constant pressure on the ends of the two springs, whereby the force of the first named spring will be directed against both pawls, so that the swinging of the lever will cause the lifting pawl to be forced against the rack teeth and lift the rack while the holding pawl will also be always forced against the teeth so as to hold it in its lifted position.

8. In a pawl motion for a lifting jack, the combination with a rack and an operating lever, of a pivoted holding pawl, a lifting pawl pivotally connected to the short arm of the lever, an extension spring connected with the lifting pawl and extending beyond the holding pawl, a spring on the holding pawl connected to the outer end of said extension spring, and means for exerting pressure on the ends of the two springs, whereby the force of the first named spring will be directed against both pawls, so that the swinging of the lever will cause the lifting pawl to be forced against the rack teeth and lift the rack while the holding pawl will also be always forced against the teeth so as to hold it in its lifted position.

9. In a jack, the combination with a frame and a rack movable vertically therein, of an operating lever pivoted on the frame, a holding pawl for engaging the rack, a lifting pawl pivoted on the short arm of the lever under the holding pawl, a spring mounted on the upper side of the holding pawl, a second spring extending down past the holding pawl from the top of the first spring to which it is connected and connected with the lifting pawl at such a point that when the lifting pawl is lowered the second spring will be stretched, the first spring compressed, and the first spring pulled out of its normal position laterally, and means for forcing the two springs inwardly and constantly toward the holding pawl, whereby the holding pawl is always yieldingly forced by the outer spring toward the rack, so that upon the oscillation of the operating lever the pressure on the two springs will cause the operating lever to move under a tooth and lift the rack on the downward stroke of the operating lever and the holding lever to ratchet over the teeth and hold the rack in any position to which it is elevated.

10. In a jack, the combination with a frame and a rack movable vertically therein, of an operating lever pivoted on the frame, a holding pawl for engaging the rack, a lifting pawl pivoted on the short arm of the lever under the holding pawl, a spring mounted on the upper side of the holding pawl, and a second spring extending down past the holding pawl from the top of the first spring to which it is connected and connected with the lifting pawl at such a point that, when the operating handle is raised, the second spring will be stretched and the first spring compressed and the first spring will be pulled sideways out of its normal position, thus moving the lifting pawl back, whereby, on the lowering of the lever and the raising of the lifting pawl, the latter will be forced, by the return of the small spring to its normal position, into engagement with the rack and will first lift it slightly and force the holding pawl from it, due to the action of the second spring, and allow the rack to come down on the releasing of the handle, so that the lifting pawl will continue to hold the rack and let it down and the holding pawl will set into the next tooth above for the purpose of lowering the rack.

11. In a lifting jack, the combination of a frame, a rack movable therein, an operating lever pivoted on the frame, a holding pawl pivoted on the frame, a lifting pawl pivoted to the short arm of the lever beneath the holding pawl, a spring carried by the holding pawl and engaging the pawl at one end, a second spring connected at one end to the lifting pawl, the other ends of the two springs being connected together, the first spring being normally inactive and the second spring functioning to alternately urge each pawl toward and from the rack, and means mounted on the frame and movable to stress both springs so as to urge both pawls toward the rack in all positions of the lever.

12. In a lifting jack, the combination of a frame, a rack movable therein, an operating lever pivoted on the frame, a holding pawl pivoted on the frame, a lifting pawl pivoted to the short arm of the lever beneath the holding pawl, a spring carried by the holding pawl and engaging the pawl at one end, a second spring connected at one end to the lifting pawl, the other ends of the two springs being connected together, the first spring being normally inactive and the second spring functioning to alternately urge each pawl toward and from the rack, and a cam pivoted on the frame above the holding pawl and movable to a position where it will constantly stress both springs so as to urge both pawls toward the rack in all positions of the lever.

13. In a pawl motion for a rack, the combination with a pivoted lever, an operating pawl and a holding pawl connected therewith, one pivoted on a stationary axis and the other pivoted on the short arm of the lever, of a coil spring fixed to the holding pawl and extending away therefrom and having a smaller coil spring inside it projecting through it beyond the holding pawl, and connected with the operating pawl, whereby the operating pawl is controlled by the action of the inner spring for the purpose of moving the rack.

14. The combination with a rack, a lever and a pair of pawls for operating the rack, of a spring secured to and projecting from the outer face of one pawl and a spring projecting from the first spring beyond the opposite side of the first pawl and pivotally connected to the other pawl.

15. As an article of manufacture, a spring for operating two pawls comprising two sets of coils, one inside the other and projecting beyond it for connection with one of the pawls, the outer set of coils being mounted on the other pawl.

16. As an article of manufacture, a spring comprising a series of coils and a second series of coils integrally connected to the end of the first series and extending through and beyond them.

17. In a jack, the combination with a frame and a reciprocable rack therein, of an operating lever pivoted on the frame, a holding pawl for the rack pivoted on the frame, a lifting pawl pivoted to the short arm of the lever under the holding pawl, an extensible spring connected at opposite ends with the holding pawl and with the lifting pawl at a point below the holding pawl, and a second spring mounted on the holding pawl, projecting away from the lifting pawl, connected to and tending to force the end of the first named spring away from the lifting pawl and the holding pawl.

18. In a pawl motion for a rack, the combination with a pivoted lever and two pawls connected therewith, one pivoted on a stationary axis and the other pivoted on the short arm of the lever, of a coil spring movable with the upper pawl and extending upwardly therefrom and a smaller coil spring inside connected to it and projecting down through it, below the upper pawl, and connected with the lower pawl, whereby the lower pawl is controlled by the action of the inner spring for the purpose of raising and lowering the rack.

In testimony whereof I have hereunto affixed my signature.

ALVIN L. JOHNSON.